(12) United States Patent
Hatakeyama

(10) Patent No.: US 8,737,757 B2
(45) Date of Patent: May 27, 2014

(54) IMAGE PROCESSING METHOD, IMAGE PROCESSING APPARATUS, AND IMAGE PICKUP APPARATUS FOR CORRECTING DEGRADATION COMPONENT OF IMAGE

(75) Inventor: Koshi Hatakeyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 218 days.

(21) Appl. No.: 12/964,367

(22) Filed: Dec. 9, 2010

(65) Prior Publication Data

US 2011/0135213 A1 Jun. 9, 2011

(30) Foreign Application Priority Data

Dec. 9, 2009 (JP) .................................. 2009-279325

(51) Int. Cl.
*G06T 5/00* (2006.01)
(52) U.S. Cl.
USPC ......................................................... 382/260
(58) Field of Classification Search
None
See application file for complete search history.

(56) References Cited

U.S. PATENT DOCUMENTS

| 7,176,962 | B2 * | 2/2007 | Ejima ........................ 348/208.4 |
| 2008/0080019 | A1 * | 4/2008 | Hayashi et al. ............... 358/474 |
| 2008/0187038 | A1 * | 8/2008 | Currivan et al. .............. 375/233 |
| 2010/0046859 | A1 * | 2/2010 | Hitomi et al. ................. 382/300 |

FOREIGN PATENT DOCUMENTS

| JP | 06-113309 A | 4/1994 |
| JP | 2000-156816 A | 6/2000 |
| JP | 2005-175584 A | 6/2005 |
| JP | 2007-061558 A | 3/2007 |
| JP | 2007-183842 A | 7/2007 |

OTHER PUBLICATIONS

Hatakeyama, Koshi. "Image Processing Method, Image Processing Apparatus, and Image Pickup Apparatus for Correcting Degradation Component of Image" Specification and Drawings of unpublished related co-pending U.S. Appl. No. 12/964,339, filed Dec. 9, 2010, pp. 1-89.

Japanese Office Action cited in related U.S. Appl. No. 12/964,339. Dated Oct. 22, 2013.

* cited by examiner

*Primary Examiner* — Nirav G Patel
*Assistant Examiner* — Delomia Gilliard
(74) *Attorney, Agent, or Firm* — Rossi, Kimms & McDowell LLP

(57) ABSTRACT

An image processing method includes the steps of generating a first image through restoration processing of an amplitude component and a phase component of an input image, generating a second image that has an equal state of the phase component to that of the first image and a different state of the amplitude component from that of the first image through restoration processing of the phase component without restoration processing of the amplitude component of the input image, obtaining difference information between the first image and the second image, setting a restoration level adjustment factor used to adjust a restoration degree in the restoration processing, and generating a restoration adjusted image by composing the difference information with the second image according to the restoration level adjustment factor.

6 Claims, 9 Drawing Sheets

PRIOR ART

IMAGE PROCESSING METHOD, IMAGE PROCESSING APPARATUS, AND IMAGE PICKUP APPARATUS FOR CORRECTING DEGRADATION COMPONENT OF IMAGE

BACKGROUND OF THE INVENTION

1. Field of the Invention

The present invention relates to image processing for correcting (or reducing) a deterioration component of an image generated by image pickup, utilizing image restoration processing.

2. Description of the Related Art

An image obtained by capturing an object by an image pickup apparatus, such as a digital camera, contains a blur component as an image deterioration component, such as the spherical aberration, coma, curvature of field, and astigmatism of an image pickup optical system. This blur component occurs when a light flux emitted from one point of the object, which is expected to converge on one point on an image pickup surface when there is no aberration or diffraction, forms an image with some divergence.

The blur component, as used herein, is optically represented by a point spread function ("PSF") and is different from a blur caused by defocusing. A color shift in a color image caused by longitudinal chromatic aberration, chromatic spherical aberration, or chromatic coma of the image pickup optical system is a difference of the blurring degree among wavelengths of the light. A lateral color shift can be regarded as a position shift or phase shift due to a difference of the image pickup magnification for each wavelength of the light if the lateral color shift is caused by the lateral chromatic aberration of the image pickup apparatus.

An optical transfer function ("OTF") obtained by performing a Fourier transform for the PSF is frequency component information of the aberration and is represented by a complex number. An absolute value of the OTF or an amplitude component is referred to as a modulation transfer function ("MTF") and a phase component is referred to as a phase transfer function ("PTF"). The MTF and the PTF are frequency characteristics of an amplitude component and a phase component of the image deterioration due to the aberration. The phase component will be expressed as a phase angle by the following equation, where Re(OTF) and Im(OTF) are a real part and an imaginary part of the OTF:

$$PTF = \tan^{-1}(Im(OTF)/Re(OTF))$$

Thus, the OTF of the image pickup optical system deteriorates the amplitude component and the phase component of the image, and the deteriorated image has an asymmetrical blur state of points of the object like the coma.

In addition, the lateral chromatic aberration (i.e., chromatic aberration of magnification) occurs when an imaging position shifts due to a difference of an imaging magnification for each wavelength of the light, and is obtained as RGB chromatic components, for example, in accordance with the spectral characteristic of the image pickup apparatus. The image divergence occurs not only when the image position shifts among the RGB, but also when the imaging position shifts for each wavelength of a chromatic component or when the phase shifts. Therefore, due to the phase degradation component of the aberration, asymmetry of the PSF is viewed on a primary section of each direction (azimuth direction) orthogonal to a principal ray (a ray that passes the center of the pupil of the image pickup optical system). The amplitude degradation component affects the size of the spread of the PSF for each azimuth direction.

In order to highly precisely correct through image processing the image degradation caused by the image pickup optical system, it is thus necessary to correct the phase degradation component and the amplitude degradation component of the aberration.

Edge enhancement processing is a known method of correcting the amplitude degradation component by detecting an edge portion in an image and by enhancing the edge as disclosed in Japanese Patent Laid-Open No. ("JP") 2000-156816.

A geometric correction is a known method of correcting a phase degradation component by varying an image magnification for each chromatic component of an image as disclosed in JP 06-113309.

Another known method of correcting the amplitude degradation component and the phase degradation component utilizes the OTF information of the image pickup optical system. This method is referred to as an image restoration or image recovery, and processing used to correct (or reduce) an image degradation component utilizing the OTF information will be referred to as image restoration processing hereinafter.

The image restoration processing will be outlined as follows: Assume that g(x,y) is a deteriorated image (input image), f(x,y) is a non-deteriorated, original image, and h(x,y) is the PSF as a Fourier pair of the OTF. Then, the following equations are established, where * denotes a convolution and (x,y) denotes a coordinate on an image.

$$g(x,y) = h(x,y) * f(x,y)$$

The above equation is converted into a display format on a two-dimensional frequency plane by a Fourier transform, which is a format of a product for each frequency. "H" denotes a Fourier-transformed PSF or corresponds to the OTF. (u,v) denotes a coordinate on the two-dimensional frequency plane or corresponds to a frequency.

$$G(u,v) = H(u,v) \cdot F(u,v)$$

In order to obtain the original image from the deteriorated image, both sides are divided by H as follows:

$$G(u,v)/H(u,v) = F(u,v)$$

When this F(u,v) is inverse-Fourier-transformed and returned to the real surface, the restored image corresponding to the original image f(x,y) can be obtained.

Where R denotes an inverse Fourier transform of $H^{-1}$, the original image can also be obtained through the convolution processing to the image on the real plane as in the following equation:

$$g(x,y) * R(x,y) = f(x,y)$$

This R(x,y) is referred to as an image restoration filter. For a two-dimensional image, the image restoration filter is usually a two-dimensional filter having a tap (cell) corresponding to each pixel of the image. In general, as the number of taps in the image restoration filter increases, the restoration precision improves. The image restoration filter needs to reflect at least an aberrational characteristic, and is remarkably different from a conventional edge enhancement filter (high-pass filter) having about three taps in each of the horizontal and vertical directions. Since the image restoration filter is prepared based on the OTF, the deterioration of each of the amplitude component and the phase component can be highly precisely corrected.

The real image has a noise component, and the noise component is remarkably amplified disadvantageously along with the restoration of the deteriorated image when the restoration utilizes the image restoration filter made with a perfect reciprocal of the OTF. With noises, an image worth viewing cannot generally be obtained.

This can be expressed by the following equations where N denotes a noise component:

$$G(u,v) = H(u,v) \cdot F(u,v) + N(u,v)$$

$$G(u,v)/H(u,v) = F(u,v) + N(u,v)/H(u,v)$$

For example, like a Wiener filter illustrated by Equation 1, there is a known method of controlling the restoration degree (or restoration level) in accordance with a signal to noise ratio ("SNR") between an image signal and a noise signal:

$$M(u,v) = \frac{1}{H(u,v)} \frac{|H(u,v)|^2}{|H(u,v)|^2 + SNR^2} \qquad \text{Equation 1}$$

M(u,v) denotes a frequency characteristic of the Wiener filter, and |H(u,v)| denotes an absolute value (MTF) of the OTF. For each frequency, this method further restrains the restoration gain as the MTF is smaller or the SN ratio is lower, and further enhances the restoration gain as the MTF is larger or the SN ratio is higher. In general, the MTF of the image pickup optical system is high on the low frequency side and low on the high frequency side, and thus the restoration gain of the image is restrained substantially on the high frequency side.

When the noises are impermissible to the desired image quality after the restoration processing is performed by setting the actual SNR to a parameter, an additional restraint on the noise amplification is necessary by adjusting the SNR parameter so as to reduce the restoration gain. This corresponds to the SNR value in Equation 1 set to a larger value. In addition, when there is a difference between the aberrational characteristic in the actual image pickup condition and the aberrational characteristic estimated by the image restoration filter, the restored image may contain a problem of an artifact, such as ringing. Moreover, when the restoration degree is different from the estimated one for each of the RGB chromatic components, the restored image may be colored or a false color may occur. This false color is also one of the artifacts, such as noises and ringing.

FIG. 15 illustrates false colors in a restored image. The false color occurs as illustrated by a broken line in FIG. 15. A false color "A" occurs when an edge part is further colored than a pre-restoration image caused by the manufacturing error. A false color "B" occurs when a periphery of a brightness saturation part is further colored than the pre-restoration image caused by the brightness saturation generated by the intensity of solar reflected light. A false color "C" occurs when the edge part is further colored than the pre-restoration image caused by defocusing.

In the Wiener filter, the restoration degree lowers by setting a large value to the SNR value in Equation 1. The restoration degree starts dropping from a high frequency and the pre-restoration frequency characteristic cannot be reproduced even when the restoration degree is reduced. This is clear from the fact that M=1 is not established or the image restoration filter does not affect the image unless the SNR has a frequency characteristic in the Equation 1.

In order to adjust the restoration degree, JP 2007-183842 sets a parameter used to design the image restoration filter as in Equation 2:

$$F(u,v) = \frac{\alpha H(u,v)^* + 1 - \alpha}{\alpha |H(u,v)|^2 + 1 - \alpha} \times G(u,v) \qquad \text{Equation 2}$$

F(u,v) and G(u,v) are Fourier transforms of the restored image and the deteriorated image, respectively. The adjustment parameter α provides a change from a filter that affects nothing (α=0) to an inverse filter (α=1), and the restoration degree of the image is adjustable in a range from the original image to the maximum restored image.

The image restoration method disclosed in JP 2007-183842 is a continuously adjusting method of the restoration degree including a reproduction of the original image. Apparently, this adjustment can successfully restraint generations of noises, ringing, and a false color. However, this image restoration method requires a recalculation of an image restoration filter and additional convolution processing to an input image whenever the parameter is changed.

In addition, since the deteriorated image is closer to the original image as the restoration degree is made lower, an aberrational component having asymmetrical blur again appears, such as the lateral chromatic aberration and the coma. The asymmetry of the aberration is caused by a phase shift for each frequency for forming the PSF. On the image, the coma degrades the image quality due to the deletion of an image, and the lateral chromatic aberration degrades the image quality through a chromatic shift. In particular, the lateral chromatic aberration is likely to stand out, and has conventionally been corrected as in a method disclosed in JP 06-113309. The method disclosed in JP 2007-183842 can correct the lateral chromatic aberration only when the restoration degree is high, and the lateral chromatic aberration becomes larger as the restoration degree is lower.

The adjustable restoration degree can restrain the problem, but increase the asymmetry of the aberration, such as the lateral chromatic aberration. In addition, the processing load increases because a lateral chromatic aberration amount varies and a correction amount of the lateral chromatic aberration needs to be changed in accordance with the setting of the restoration degree even when the lateral chromatic aberration correction processing is introduced in addition to the image restoration processing.

SUMMARY OF THE INVENTION

The present invention provides an image processing method, an image processing apparatus, and image pickup apparatus, and an image processing program which can correct an asymmetrical aberration in an image, and adjust a restoration degree and a risk of generating a problem.

An image processing method according to one aspect of the present invention includes the steps of obtaining an input image generated by an image pickup system, generating a first image through restoration processing of an amplitude component and a phase component of the input image, generating a second image that has an equal state of the phase component to that of the first image and a different state of the amplitude component from that of the first image through restoration processing of the phase component without restoration processing of the amplitude component of the input image, obtaining difference information between the first image and the second image, setting a restoration level adjustment factor used to adjust a restoration degree in the restoration processing, and generating a restoration adjusted image by composing the difference information with the second image according to the restoration level adjustment factor.

An image processing apparatus according to another aspect of the present invention configured to process an input image generated by an image pickup system includes a processor configured to generate a first image through restoration processing of an amplitude component and a phase component of the input image, and to generate a second image that has an equal state of the phase component to that of the first image and a different state of the amplitude component from that of the first image through restoration processing of the phase component without restoration processing of the amplitude component of the input image, a factor setting unit configured to set a restoration level adjustment factor used to adjust a restoration degree in the restoration processing, and an image restoration unit configured to generate a restoration adjusted image by composing difference information between the first image and the second image, with the second image according to the restoration level adjustment factor.

An image pickup apparatus that includes an image pickup system and the above image processing apparatus also constitutes another aspect of the present invention.

An image processing program according to still another aspect of the present invention enable a computer to execute the above image processing method. A non-transitory recording medium storing that program also constitutes one aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of an embodiment of the present invention.

A description will now be given of a principal part of an image processing method according to this embodiment of the present invention. This embodiment extracts an aberrational component of an input image, controls a removal amount of the aberration component, and thereby adjusts the restoration degree (or restoration level). When the restoration degree is adjusted, the asymmetry of the aberration among the aberrational components does not vary and only a blur amount varies.

Figure 1:
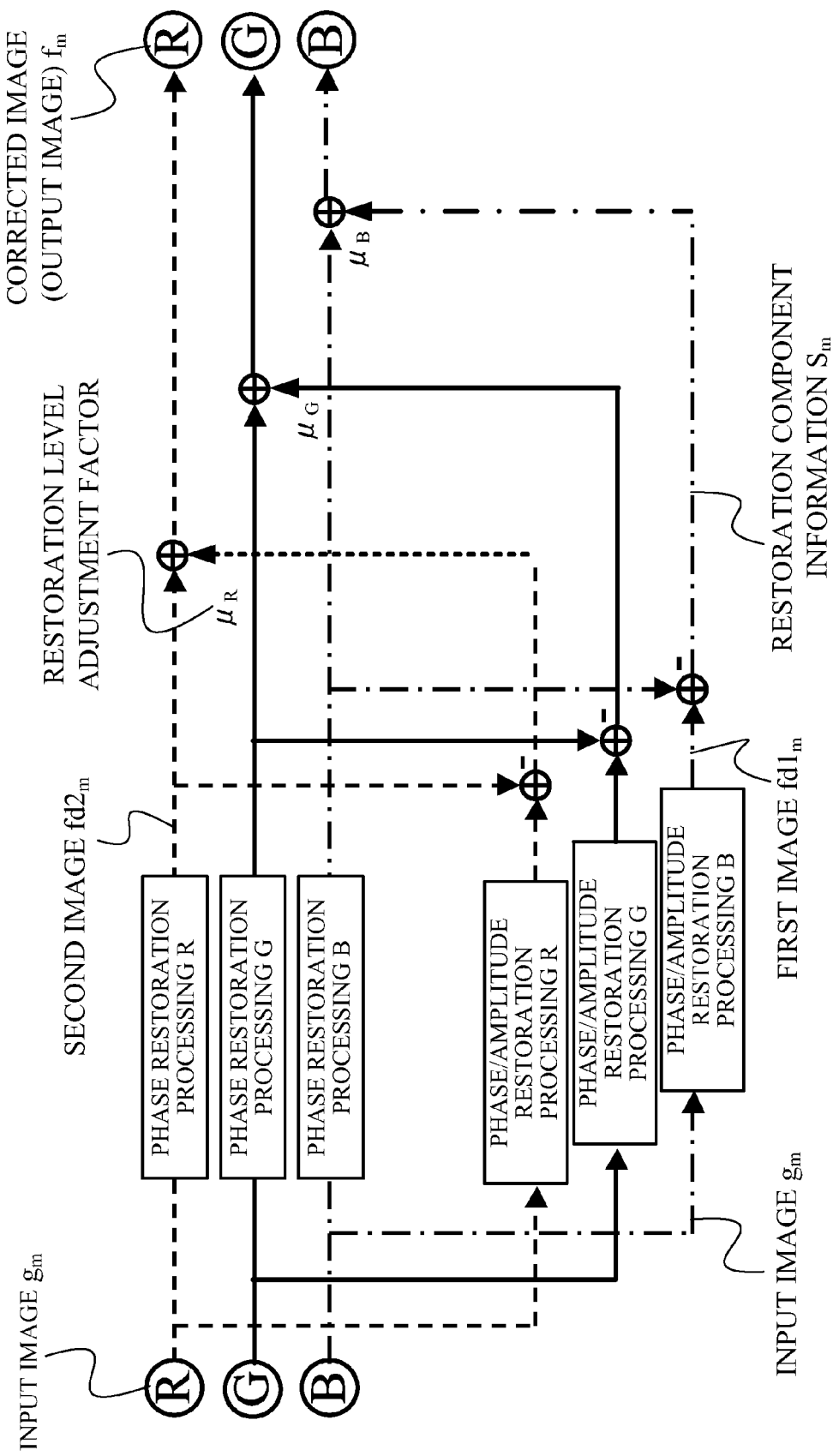
FIG. 1 is an explanatory view of an image processing method according to one embodiment of the present invention.

FIG. 1 illustrates a flow of the image processing method executed in this embodiment. In the following description, a sign "m" denotes a chromatic component of an image (such as R, G, and B). For instance, $A_m$ denotes $(A_R, A_G, A_B)$ which denotes an R element of A, a G element of A, and a B element of A, respectively. "A" corresponds to g, f, fd, S, and Sd, etc. in FIG. 1.

A first image $fd1_m$ is obtained by restoration processing to a phase component and an amplitude component of an input image that is deteriorated by the OTF, by utilizing an image restoration filter that has been selected or generated for each chromatic component to an input image $g_m$ having RGB chromatic components. Since this restoration processing can correct both the phase component and the amplitude component, the image restoration filter can use, for example, the Wiener filter.

Since the phase component and the amplitude component of the aberration have been corrected in the first image $fd1_m$, the asymmetry of the aberration is removed, the blur is reduced, and the sharpness improves. Nevertheless, this image can contain amplified noises or false colors.

A second image $fd2_m$ is obtained by restoration processing to a phase component without restoration processing to an amplitude component of the input image that is deteriorated by the OTF, by utilizing an image restoration filter for an input image $g_m$ for each chromatic component. Since only the phase component of the aberration is corrected in the second image $fd2_m$, the asymmetry of the aberration is removed but the blur is not corrected. In other words, while the phase component (PTF) of the OTF is corrected in the second image $fd2_m$, the MTF as its absolute value component does not vary.

Restoration component information $S_m$ is generated as difference information between the first image $fd1_m$ and the second image $fd2_m$ for each chromatic component by subtracting a signal value of the second image $fd2_m$ from that of the first image $fd1_m$ for each corresponding pixel as in Equation 3:

$$S_m = fd1_m - fd2_m \qquad \text{Equation 3}$$

A corrected image $f_m$ is obtained as restoration adjusted image (output image) by composing the restoration component information $S_m$ with the second image $fd2_m$ for each chromatic component as in Equation 4 in accordance with the restoration level adjustment factor $\mu_m$.

$$f_m = fd2_m + \mu_m \cdot S_m \qquad \text{Equation 4}$$

As understood from Equation 4, the corrected image $f_m$ is equal to the second image $fd2_m$ when the restoration level adjustment factor $\mu_m$ is 0, and the corrected image $f_m$ is equal to the first image $fd1_m$ when the restoration level adjustment factor $\mu_m$ is 1. The restoration degree is continuously adjusted between the first image $fd1_m$ and the second image $fd2_m$ when the restoration level adjustment factor $\mu_m$ is between 0 and 1.

Since the phase component is corrected and only the amplitude component (blur amount) is different in both the second image $fd2_m$ and the restoration component information $S_m$, the phase component does not vary according to an adjustment amount of the restoration degree and this embodiment can always maintain the corrected state of the phase component. The sharpness, the lateral chromatic aberration, and the coma vary with the restoration degree according to the conventional method, whereas the method of this embodiment maintains the symmetry and varies only the sharpness.

Next follows a description of a specific process of each step in order of the flow. A description of processing, which is the same as corresponding processing in Embodiment 1 will be omitted.

"Input Image $g_m$"

An input image $g_m$ is basically a digital image obtained through a photoelectric conversion by an image pickup device, of an object image formed by the image pickup optical system, and deteriorates due to the OTF of the aberration of the image pickup optical system including a lens and a variety of optical filters. The image pickup optical system can use a mirror (reflective surface) having a curvature as well as the lens. The image pickup system includes the image pickup optical system and the image pickup device.

The image processing method according to this embodiment of the present invention is also applicable to an input image generated by the image pickup system that has no image pickup optical system. An image pickup apparatus, such as a scanner and an X-ray image pickup apparatus, provides image pickup by bringing an image pickup device into contact with an object surface and does not have an image pickup optical system, such as a lens, but the image more or less deteriorates through image sampling by the image pickup device. The degradation characteristic in this case is not caused by the OTF of the image pickup optical system (OTF in a narrow sense) but by a system transmission function of the image pickup system. This system transmission function corresponds to the OTF, and thus the OTF in this embodiment of the present invention means the OTF in a broad sense, which contains the system transmission function of the image pickup system that includes no image pickup optical system.

The input image $g_m$ has information on the RGB chromatic components, for example. As the chromatic component, another generally used color space may be selected and used such as the brightness, hue, chroma expressed by LCH, and the brightness, color difference, etc. signal expressed by YCbCr. Another color space may be used, such as XYZ, Lab, Yuv, and JCh or the color temperature.

The chromatic component information may be one chromatic component signal value of each pixel in a mosaic image or a plurality of chromatic component signal values of each pixel in a demosaic image obtained by color interpolation processing (demosaicing processing) for the mosaic image. The mosaic image is also referred to as a RAW image as an image before a variety of image processing is performed, such as the color interpolation processing, gamma transformation, and JPEG.

In particular, in obtaining a plurality of chromatic component information by a single-board image pickup device, a mosaic image in which each pixel has a signal value of one chromatic component is obtained by arranging a color filter having a different spectral transmittance at each pixel. In this case, a demosaicing image in which each pixel has signal values of a plurality of chromatic components can be generated through color interpolation processing. In using a multi-board (for example, three-board) image pickup device, a signal value of a chromatic component which is different for each image pickup device can be obtained by arranging a color filter that has a different spectral transmittance for each image pickup device. In this case, since signal values of each chromatic component have been obtained for corresponding pixels among the image pickup devices, an image having signal values of a plurality of chromatic components for each pixel can be generated without the color interpolation processing.

A variety of correctional information can be attached to the input image $g_m$ or the output image and used to correct the image or an image pickup condition, such as a focal length, an aperture value, and an object distance of a lens. In particular, correctional information in this embodiment contains restoration level adjustment factor $\mu$.

When one closed image pickup apparatus performs a series of processing from image pickup to outputting, the image pickup apparatus can obtain the image pickup condition information or correctional information even when the information is not attached to the image. In order to obtain a RAW image from the image pickup apparatus and to perform correction processing and development processing in another image processing apparatus, the image may contain the image pickup condition information and correctional information, as described above.

When correctional information is pre-stored in the image processing apparatus and a system can select a correction factor from the image pickup condition information, it is not always necessary to attach correctional information to the image.

A user can change a correction factor value although the correctional information can be obtained as a correction factor as an initial value as described above. The user can evaluate an output image, change a correction factor, and obtain a desired output image by using a monitor of the image pickup apparatus or a monitor that is part of the image processing system when the image processing apparatus is a unit different from the image pickup apparatus.

"Image Restoration Processing"

Figure 2:
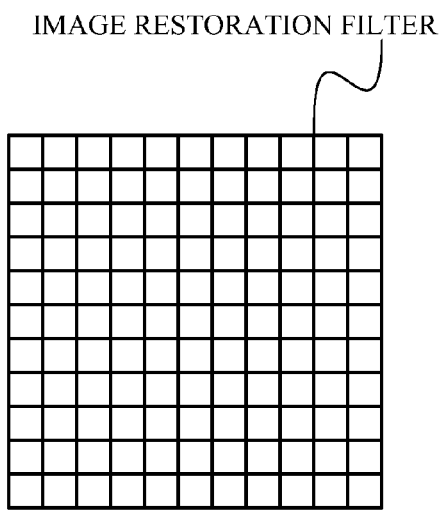
FIG. 2 is an explanatory view of an image restoration filter used for the image processing method according to this embodiment.

FIG. 2 schematically illustrates an image restoration filter. The number of taps (or cells) of the image restoration filter can be determined according to the aberrational characteristic of the image pickup optical system and the required restoration accuracy. FIG. 2 illustrates a two-dimensional filter of 11×11 taps as an example. In FIG. 2, a (factor) value of each tap is omitted.

Each tap of the image restoration filter corresponds to each pixel of the input image which is to undergo the image restoration processing, and receives the convolution processing in the image restoration processing step. In the convolution processing, in order to improve a signal value of a certain pixel in an input image, that pixel is matched to the center of the image restoration filter. A product between a signal value of an image and a factor value of the image restoration filter is calculated for each of the input image and corresponding pixels of the image restoration filter, and a sum total is replaced with the signal value of the central pixel.

Figure 3:
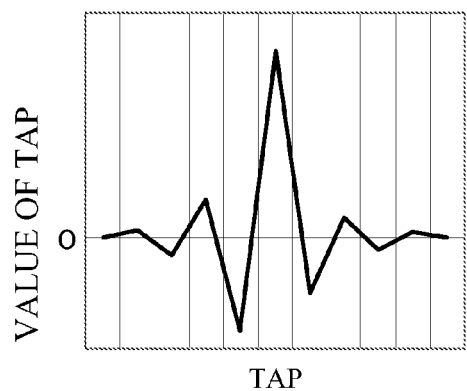
FIG. 3 is an explanatory view of an image restoration filter used for the image processing method according to this embodiment.

FIG. 3 illustrates a factor value of each tap on a section of the image restoration filter (which is also referred to as a tap value). A distribution of the tap values of the image restoration filter serves to return signal values that have spatially spread due to the aberrations to ideally the original, one point.

The image restoration filter can be obtained by calculating or measuring the OTF of the image pickup system (image pickup optical system), and by performing an inverse-Fourier transform of a function based on the inverse function of the OTF. In general, the influence of the noises needs to be considered, and a variety of image restoration filter preparing methods relating to the Wiener filter may be selected and used.

The OTF may reflect the image pickup optical system as well as a degradation factor of the OTF in the photography process. For example, an optical low-pass filter having birefringence restrains a high-frequency component to a frequency characteristic of the OTF. The shape and aperture ratio of a pixel opening of the image pickup device also influence the frequency characteristic, as well as a spectral characteristic of a light source and spectral characteristics of a variety of wavelength filters. The image restoration filter may be prepared on the basis of the OTF including them in a broad sense.

When an input image is a color image in a RGB format, three image restoration filters corresponding to each of the RGB chromatic components may be prepared. The image restoration filter for each chromatic component has a different characteristic due to the chromatic aberration, since the image pickup optical system has a chromatic aberration and the blur degree is different for each chromatic component. This means that the sectional view of FIG. 3 is different for each chromatic component.

It is unnecessary to arrange longitudinal and lateral taps of the image restoration filter in a square array, and the arrangement may be arbitrarily changed.

When the image restoration filter is a two-dimensional filter that is divided into 100 or more as illustrated in FIG. 2, the image can be restored from a variety of aberrations that broadly spread from the imaging position, such as the spherical aberration, the coma, the axial chromatic aberration, and the off-axis chromatic flare of the image pickup optical system. The image can also be satisfactorily restored from asymmetric aberrations, such as the coma, the off-axis chromatic flare, the sagittal flare, and the astigmatism (curvature of field).

Figure 4A:
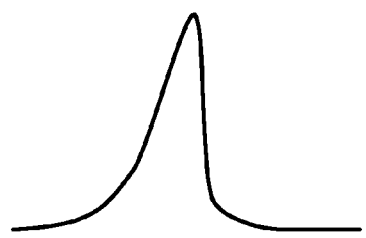
FIGS. 4A-4D are explanatory views each illustrating a corrected state of a point image of the image processing method according to this embodiment.

A description will now be given of an aberrational correction characteristic of the image restoration filter in the image restoration processing used to obtain the first image $fd1_m$ by using the coma as an example. A section view in a meridional direction of the PSF of the coma has an asymmetric blur as illustrated in FIG. 4A. This is because the absolute value component (MTF) of the OTF as the frequency characteristic of the PSF deteriorates as in FIG. 5A(a) and the phase component (PTF) has a phase shift as in FIG. 5B(a). The asymmetry occurs on the section of the PSF due to the phase shift.

An operation of the image restoration filter will be described by utilizing Equation 5:

$$OTF(u, v)\left[\frac{1}{OTF(u, v)} \frac{|OTF(u, v)|^2}{|OTF(u, v)|^2 + SNR^2}\right] = \frac{|OTF(u, v)|^2}{|OTF(u, v)|^2 + SNR^2} = \frac{MTF(u, v)^2}{MTF(u, v)^2 + SNR^2}$$

Equation 5

Figure 4B:
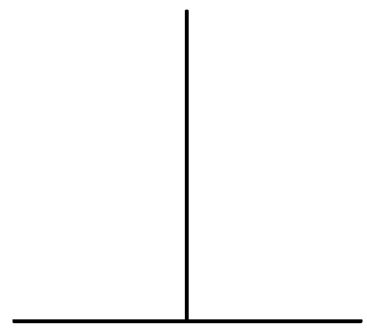
Figure 5A:
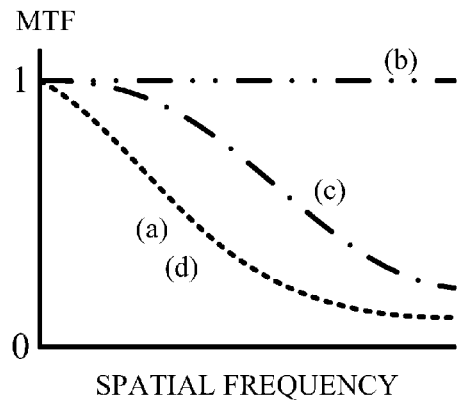
FIGS. 5A-5B are explanatory views each illustrating a relationship between the amplitude and phase in the image processing method according to this embodiment.
Figure 5B:
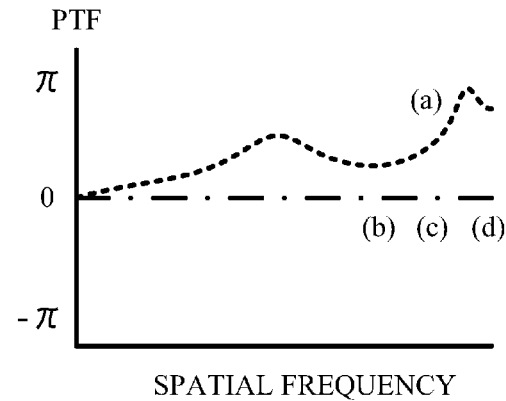

The inside of [ ] in Equation 5 is a frequency characteristic of the Wiener filter. When the restoration filter is applied to the OTF as a degradation characteristic of an optical system, the part of 1/OTF inside of [ ] serves as an inverse filter, and both the amplitude component and the phase component are perfectly restored. The PSF at this state is a state that has no aberration or no spread of the image as illustrated in FIG. 4B. The MTF restores to 1 over the entire frequency range as illustrated in FIG. 5A(b), and the PTF is restored to 0 over the entire frequency range as illustrated in FIG. 5B(b).

However, when the above noise amplification problem etc. are considered, a $MTF^2/(MTF^2+SNR^2)$ portion in [ ] of Equation 5 is used to restrain the restoration degree, instead of the above perfect restoration. The PSF at this state is a state illustrated in FIG. 4C, where the MTF properly recovers as illustrated in FIG. 5A(c) and the PTF restores to 0 over the entire frequency range as illustrated in FIG. 5B(c).

Figure 4C:
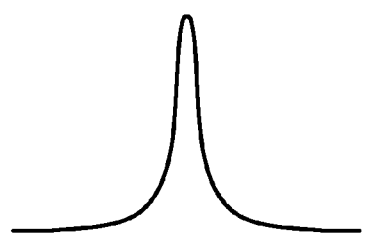

Since the restored OTF becomes $MTF^2/(MTF^2+SNR^2)$ from Equation 5, the phase component (PTF) becomes a corrected state regardless of the restoration degree. In other words, although a spread of a point image changes according to the restoration degree, the PSF has a blur condition that is symmetric in the section as illustrated in FIG. 4C.

A description will now be given of the aberrational correction characteristic of the image restoration filter in the image restoration processing used to obtain a second image $fd2_m$ by utilizing the coma in an example. An operation of the image restoration filter will be discussed by utilizing Equation 6:

$$OTF(u, v)\left[\frac{1}{OTF(u, v)}|OTF(u, v)|\right] = |OTF(u, v)| = MTF(u, v)$$

Equation 6

Figure 4D:
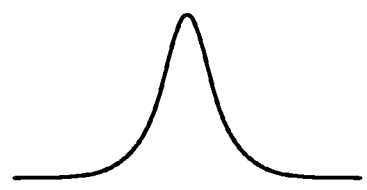

As apparent from Equation 6, the restored OTF becomes the MTF and thus the absolute value component (MTF) does not vary and only the phase component (PTF) is corrected. The PSF at this state is as illustrated in FIG. 4D, the MTF is similar to the pre-restoration state as illustrated in FIG. 5A(d), and the PTF is restored to 0 over the entire frequency range as illustrated in FIG. 5B(d). Since the phase component is corrected, the asymmetry of the blur is corrected, although the sharpness of the PSF is not improved.

By performing a convolution process for an input image $g_m$ by utilizing an image restoration filter in this real space, the image can be restored in the image restoration processing without the Fourier transform or the inverse Fourier transform of the image.

As long as an image is linearly deteriorated, the image restoration processing can provide a precise inverse process for restoration to the pre-restored, original image. Therefore, the input image may not receive a variety of adaptive nonlinear processing. When a nonlinear process is included in the demosaicing processing, for example, the image restoration processing may be performed for the mosaic image (RAW image).

When the degradation by the color interpolation processing is linear, the demosaic image can also be restored in a generation of the image restoration filter by considering this degradation function. Even when the required accuracy of the restoration is low or when only an image that has undergone a variety of image processing is available, the restoration processing may be performed for the demosaic image.

The image processing method according to this embodiment of the present invention is applicable whether the input image is a mosaic image or a demosaic image.

"First Image $fd1_m$"

A first image $fd1_m$ is obtained by the image restoration processing that uses the image restoration filter that restores both the amplitude component and the phase component. In the conventional image restoration, this first image $fd1_m$ is output as a restored image (corrected image). When the first image $fd1_m$ satisfies the necessary image quality, it can be used as a corrected image $f_m$ but it actually contains amplified noises and false colors, as described above. The noise amplification can be restrained by presetting an appropriate restoration degree of the image restoration filter, but it is difficult to predict generation amounts of the ringing and the false color and thus it is necessary to reevaluate the restored image and to adjust the restoration degree again.

"Second Image $fd2_m$"

A second image $fd2_m$ is obtained by image restoration processing that utilizes an image restoration filter that restores only a phase component. No noise amplification occurs in this second image $fd2_m$, since no absolute value component (MTF) of a pixel value of the image has been amplified. In addition, since the phase degradation component is corrected, the lateral chromatic aberration, for example, is removed which causes the asymmetry among the imaging positions of the chromatic components in the meridional direction. The coma is symmetrical in all azimuth directions including the meridional direction and the sagittal direction, and thus is corrected to an aberrational shape that has point symmetry like the astigmatism. The post-correction coma has no rotational symmetry because the MTF depends upon the azimuth direction and the blur amount is different for each azimuth direction although the phase is ranged in all azimuth directions.

"Restoration Component Information $S_m$"

Restoration component information $S_m$ for each chromatic component can be generated by subtracting the second image $fd2_m$ from the first image $fd1_m$ as in Equation 3 (subtraction processing for each chromatic component and for each pixel). For the first image $fd1_m$ and the second image $fd2_m$, their degraded phase components (phase degradation components) of the image pickup optical system are equally corrected, their phase components have similar states, and their amplitude components have different states. Therefore, the restoration component information $S_m$ represents difference information of the amplitude component between the first image $fd1_m$ and the second image $fd2_m$.

The phase component of each of the first image $fd1_m$ and the second image $fd2_m$ is expected to be similar in which a phase degradation component by the image pickup optical system is sufficiently removed. On the other hand, their amplitude components are different because the restoration degree can be adjusted according to the following restoration level adjustment factor.

Thus, the restoration component information $S_m$ contains an aberrational component other than a phase shift of the second image $fd2_m$, and a noise increase component, a ringing component, and a false color component which are generated by the image restoration processing.

"Restoration Level Adjustment Factor $\mu$ and Corrected Image $f_m$"

A corrected image $f_m$ is obtained by composing the restoration component information $S_m$ with the second image $fd2_m$ for each chromatic component according to the restoration level adjustment factor $\mu_m$ as in Equation 4. The corrected image $f_m$ is equal to the second image $fd2_m$ when the restoration level adjustment factor $\mu_m$ is 0, and the corrected image $f_m$ is equal to the first image $fd1_m$ when the restoration level adjustment factor $\mu_m$ is 1. When the restoration level adjustment factor $\mu_m$ is between 0 and 1, the restoration degree can be continuously adjusted between the first images $fd1_m$ and the second image $fd2_m$.

In the second images $fd2_m$ and the restoration component information $S_m$, their phase components are corrected and only their amplitude components are different. The phase component never varies according to an adjustment amount of the restoration degree, and the phase corrected state can always be maintained. A level corrected image can be obtained by setting $\mu>1$ although a basic range of the restoration level adjustment factor $\mu$ is set to $0 \leq \mu \leq 1$.

The restoration degree can be adjusted for each chromatic component by changing the restoration level adjustment factor $\mu$ for each chromatic component. This is effective to adjusting the restoration degree for each chromatic component when the OTF changes for each chromatic component and the chromatic aberration changes due to spectral changes of an illumination light source of the object, the manufacturing errors of the image pickup optical system, etc. When the spectral characteristic of the illumination light source changes, the intensity ratio changes for each wavelength and an aberrational amount consequently changes for each chromatic component. Thus, the corrected image $f_m$ suitable for each chromatic component can be obtained by setting the restoration level adjustment factor $\mu$ for each chromatic component according to the spectral characteristic at the image pickup time.

The degradation degree may be different, for example, between left and right symmetrical positions of an image, although this is one influence of the manufacturing error in the image pickup optical system. This difference of the degradation degree appears as a difference of a blur component or a relative color shift component on the image. The blur component of the manufacturing error can be absorbed by setting the restoration level adjustment factor $\mu$ according to a fluctuation of the blur amount depending upon a position on an image.

The color shift caused by the manufacturing error can be absorbed by setting the restoration level adjustment factor $\mu$ for each chromatic component according to a fluctuation of a color shift amount depending upon a position on the image.

The evaluation of the image quality of the output image differs according to purposes. For example, noises and ringing are serious nuisances for the portrait. On the other hand, in reading a figure on a license plate of a car by utilizing a surveillance camera, etc., specifying the figure is the most important rather than noises and ringing. It is important that an output image is a worth image even when the restoration degree of the output image is low due to a significant amount of noise, ringing, or false color appears in the image for some reasons. In these cases, an adjustment of the restoration level adjustment factor $\mu$ is effective.

In the usual photography, the image quality ranges from a soft image that has an aberration and flare to a sharp image that has no aberration depending upon a user or an object. Even in these cases, an adjustment of the restoration level adjustment factor $\mu$ is effective.

The restoration component information may be extracted by transforming Equation 3 and by subtracting the first image $fd1_m$ from the second image $fd2_m$. In this case, the same effect can be obtained from an equivalent equation obtained by transforming Equation 4 and by subtracting this restoration component information from the second image $fd2_m$ according to the restoration level adjustment factor (this subtraction can be regarded as a "composition").

In order to change the restoration degree as stated above, it is conventionally necessary to change a parameter of the image restoration filter and to recalculate the image restoration filter whenever the restoration degree is changed. In addition, the convolution processing to the input image is needed by using the recalculated image restoration filter. This hinders high-speed image processing.

On the other hand, the image processing method of this embodiment changes only a composition ratio of an image in adjusting the restoration degree, and it is unnecessary to recalculate the image restoration filter or to perform the convolution processing for the input image whenever the adjustment parameter is changed. Even when the restoration degree is reduced, the asymmetry of the aberration is corrected at least to a state of point symmetry. Hence, the state in which the lateral chromatic aberration is removed is maintained and the deletion of the image as a characteristic of the coma is corrected.

Figure 6:
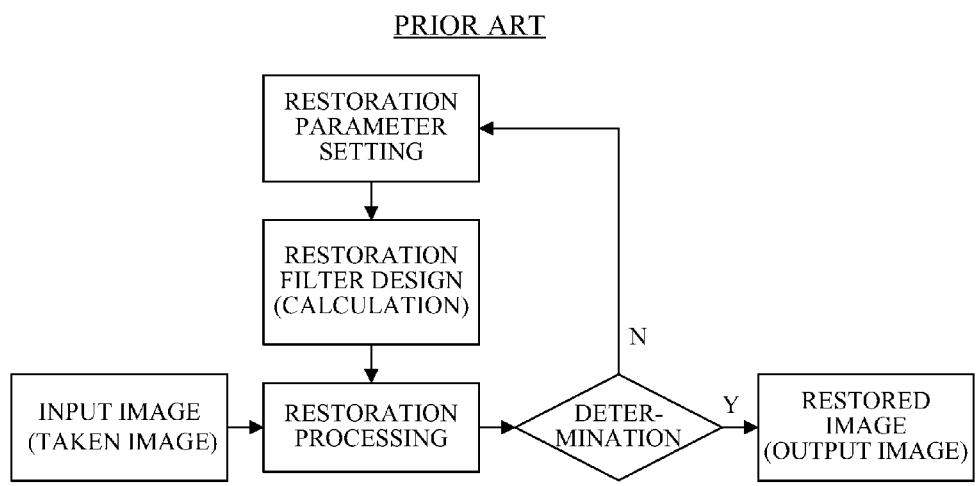
FIG. 6 is a flowchart illustrating a conventional image processing method.
Figure 7:
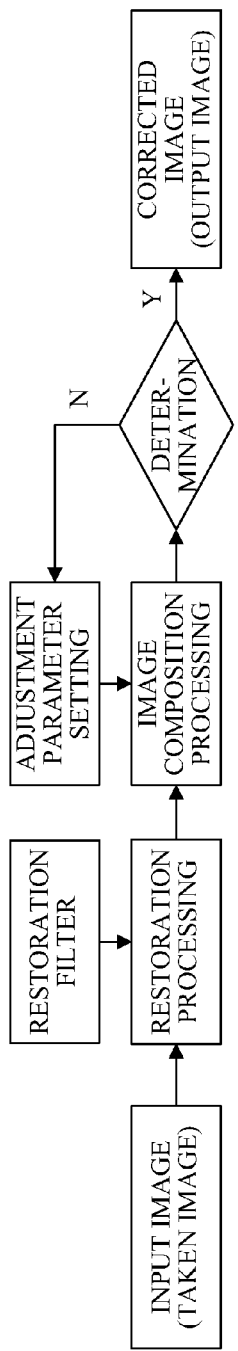
FIG. 7 is a flowchart for explaining an image processing method according to this embodiment.

The conventional image processing method and the image processing method of this embodiment will be compared with reference to FIGS. 6 and 7. FIG. 6 illustrates a flow of the conventional image processing method (image restoration processing). The image restoration processing is performed for an input image as a taken image by generating an image restoration filter based on a restoration parameter as an initial value or by utilizing a previously prepared image restoration filter as an initial value. This restored image is evaluated, and it is determined whether the restored image is to be output as it is or the restoration degree is again changed. When the restoration degree is to be changed, a restoration parameter is changed, the image restoration filter is recalculated, and the image restoration processing is again performed for the input image. When a desired image is obtained by repeating this procedure, a restored image (output image) is output.

FIG. 7 illustrates a flow of the image processing method of this embodiment (image restoration processing). The image restoration processing is performed for an input image as a taken image by generating an image restoration filter based on a restoration parameter as an initial value or by utilizing a previously prepared image restoration filter as an initial value. A restoration adjusted image is obtained by performing the image composition processing for the restored image by utilizing a previously prepared adjustment parameter, a user set adjustment parameter, or an adjustment parameter automatically determined from the image information. The restoration adjusted image is evaluated, and it is determined whether the restoration adjusted image is to be output as a corrected image (output image) or the restoration degree is again changed. When the restoration degree is to be changed, the adjustment parameter is changed and the image composition processing is again performed. The adjustment parameter, as used herein, means the above restoration level adjustment factor µ.

Thus, the conventional image restoration processing and the image restoration processing of this embodiment are greatly different from each other in whether or not the recalculation of the image restoration filter at the adjustment time is necessary, and whether or not the convolution processing as the image restoration processing is necessary between the input image and the image restoration filter.

Whether or not the resultant image can be used for the output image or whether or not the adjustment parameter is changed with a change of the restoration degree may be performed by a user based on his subjective evaluation or automatically evaluated based on a preset evaluation function of the image.

In addition, the adjustment parameter can be automatically changed in accordance with a feature amount of a pixel of an input image. The "feature amount of the pixel" is partial contrast and brightness level etc. of the input image. A method of using a differentiation filter is known, for example, as a method of detecting the partial contrast of the image. An edge part and a non-edge part in an image can be separated by using this method. Since the sharpness of the edge part influences the sharpness of the entire image, the adjustment parameter is set so that the restoration degree can be higher in the edge part. On the other hand, since the non-edge part that has a little shade does not affect the sharpness of the entire image even when the restoration degree is increased. Rather, the increased noises are problematic in this part, and thus the adjustment parameter is set so that the restoration degree may lower.

Since the SNR between the original image signal and the noise signal is worse in the part having a low brightness level, the noises are likely to stand out when the restoration degree is made larger and thus the adjustment parameter is set so that the restoration degree can be lower. On the other hand, in the brightness saturated part, the original image signal is clipped at the upper limit in the range of the image pickup device, the aberrational state is also greatly different from the expected state, and the problem caused by the image restoration is likely to occur. The problem can be avoided by setting the adjustment parameter so as to reduce the restoration degree.

Moreover, the restoration degree can be adjusted according to a type of an object by recognizing the object. For instance, a face recognition function is installed in the recent digital cameras. However, when an artifact occurs in a person's face, such as noises and false color, due to the image restoration, the image becomes significantly unnatural and thus it is necessary to properly adjust the restoration degree.

Changing the adjustment parameter in accordance with to the feature amount of the pixel means changing the adjustment parameter in accordance with a position of the image. Since this embodiment composes the image for each pixel in the image composition processing, the adjustment parameter can be comparatively easily adjusted only by changing a mixture ratio. One of the characteristics of this embodiment is to adjust the restoration degree for each pixel.

A set value of the adjustment parameter is variable according to the image pickup conditions, such as the ISO sensitivity, the focal length, the object distance, and the aperture value.

Although a fundamental flow of the image processing method of the present invention has been described, some steps out of the aforementioned steps may be performed together. Another necessary processing step may also be added before or after each step. In addition, the expression, the equal sign, and the other sign used for this description does not limit a specific algorithm of the image processing method of the present invention to this embodiment, and a necessary variation is available.

Embodiment 1

Figure 8:
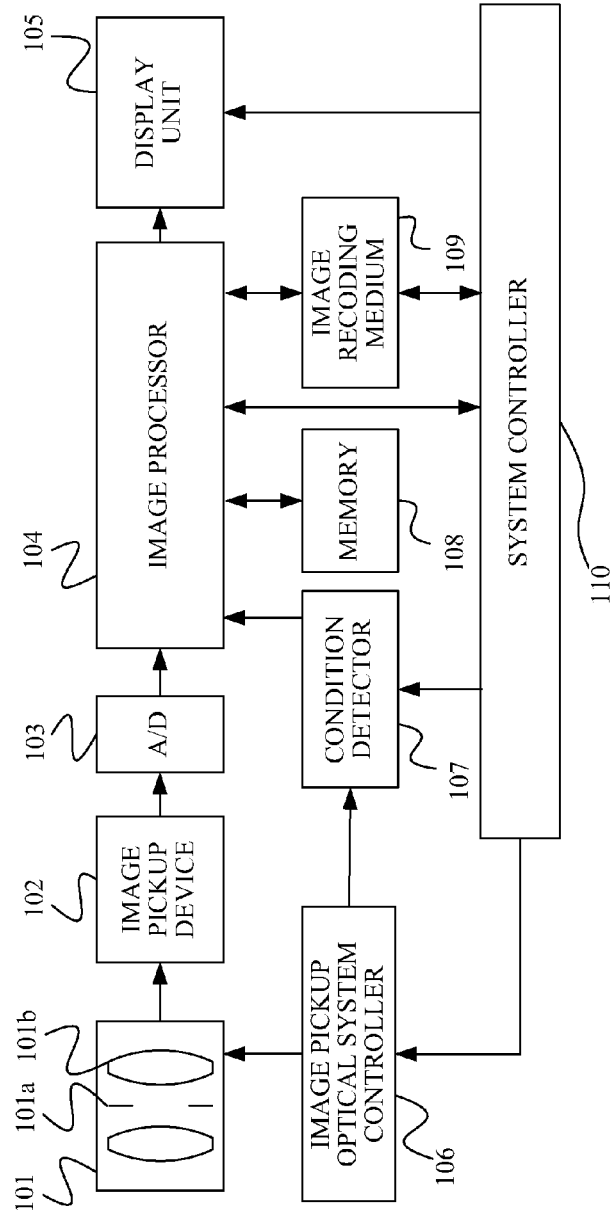
FIG. 8 is a block diagram illustrating a structure of an image pickup apparatus including the image processing apparatus according to Embodiment 1 of the present invention.

FIG. 8 illustrates a basic configuration of an image pickup apparatus including an image processing apparatus according to Embodiment 1 of the present invention.

An image pickup optical system 101 forms an object image on an image pickup device 102 by utilizing light from an object (not illustrated). The image pickup device 102 converts the object image into an electric signal. The electric signal (analogue signal) output from the image pickup device 102 is converted into digital image data through an A/D converter 103, and input to an image processor 104.

The image processor 104 performs a variety of image processing and the image restoration processing for input digital image data (input image). The image processor 104 functions as a processor, a factor setting unit, and an image restoration unit.

Initially, the image processor 104 obtains from a condition detector 107 image pickup condition information (a condition of the optical system) that is information representing a state of the image pickup optical system 101 (such as a focal length, an aperture value, and an object distance (an image pickup distance)). The condition detector 107 may obtain the image pickup condition information directly from a system controller 110 or from an image pickup optical system controller 106 that controls operations of the image pickup optical system 101.

Next, the image processor 104 selects from a memory 108 an image restoration filter suitable for the condition of the image pickup optical system 101 which is obtained from the image pickup condition information. Next, the image restoration processing to an input image and an adjustment of the restoration degree corresponding to the adjustment parameter are performed by utilizing a selected image restoration filter or an image restoration filter that is newly generated by correcting the selected image restoration filter according to image pickup condition information.

Figure 9:
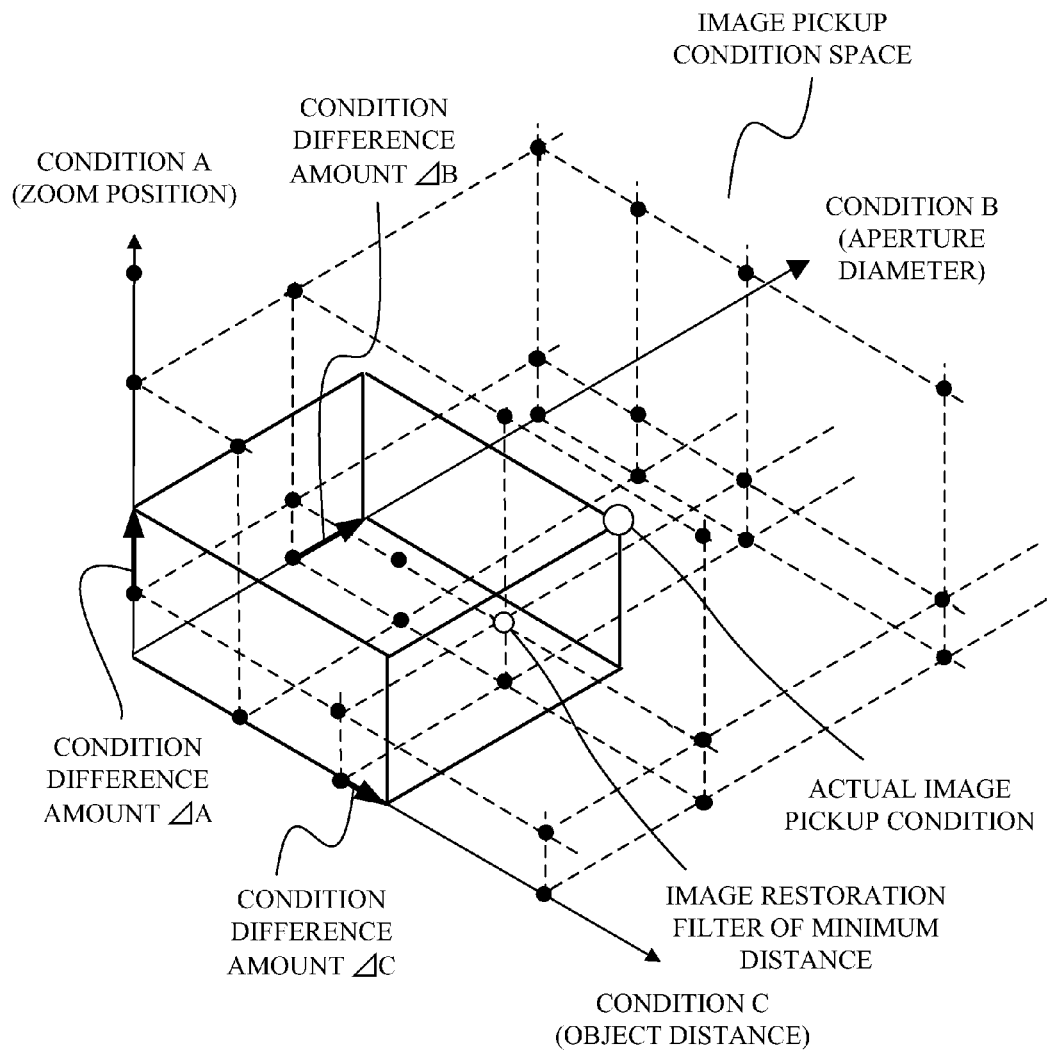
FIG. 9 is an explanatory view of a selection of the image restoration filter according to the Embodiment 1.

Referring to FIG. 9, a description will be given of a selection and correction of the image restoration filter. FIG. 9 schematically illustrates a plurality of image restoration filters (black dots) stored in the memory 108. The image restoration filters stored in the memory 108 are discretely arranged in the image pickup condition space having three image pickup conditions allocated to axes of a focal length (state A), an aperture value (state B), and an object distance (state C). A coordinate of each point (black dot) in the image pickup condition space illustrates the image restoration filter stored in the memory 108.

While the image restoration filter is arranged on lattice points on orthogonal lines for each image pickup condition in FIG. 9, the image restoration filter may be arranged off the lattice points. The type of the image pickup condition is not limited to the focal length, the aperture value, and the object distance, and the number of the image pickup conditions is not limited to three. A four-dimensional or higher image pickup condition (or four or more image pickup conditions) may be formed, and the image restoration filter may be discretely arranged in that space.

A description will be given of a method of selecting an actually used image restoration filter from among these discretely arranged image restoration filters.

In FIG. 9, an image pickup condition illustrated by a large white dot is a detected, actual image pickup condition. When there is a pre-stored image restoration filter at or near a position corresponding to the actual image pickup condition, the image restoration filter is selected and used for the image restoration processing. One method of selecting a image restoration filter near a position corresponding to the actual image pickup condition calculates a distance (or condition difference amount) in the image pickup condition space among the actual image pickup condition and the stored image pickup conditions of the image restoration filter, and selects the image restoration filter located at a position having the shortest distance. This method selects an image restoration filter located at a position corresponding to a small white dot illustrated in FIG. 9.

Another method is a method of weighing a direction in the image pickup condition space in selecting the image restoration filter. In other words, a product between a distance and a weighted distance in the image pickup condition space is used for an evaluation function and an image restoration filter having the highest value of the evaluation function is selected.

A description will now be given of a method of generating a new image restoration filter by correcting the selected image restoration filter. In correcting the image restoration filter, a distance (condition difference amount) in the image pickup condition space is calculated between the actual image pickup condition and the stored image pickup condition of the image restoration filter, and the image restoration filter located at the position of the shortest distance is selected. At this time, the condition difference amount is smallest, and thus a later used correction amount can be made small and the image restoration filter can be generated near the original image restoration filter in the image pickup condition.

In FIG. 9, the image restoration filter located at the position of the small white dot is selected. Condition difference amounts $\Delta A$, $\Delta B$, and $\Delta C$ are calculated between the actual image pickup condition and the image pickup condition corresponding to the selected image restoration filter. A condition correction factor is calculated based on the condition difference amount, and the selected image restoration filter is corrected based on the condition correction factor. Thereby, an image restoration filter corresponding to the actual image pickup condition can be generated.

Another method selects a plurality of image restoration filters located at positions near the actual image pickup condition, performs interpolation processing for the plurality of image restoration filters according to the condition difference amount, and thereby generates an image restoration filter suitable for the image pickup condition. The interpolation processing, as used herein, may interpolate factor values of corresponding taps between two-dimensional filters utilizing a linear interpolation, a polynomial interpolation, and a spline interpolation, etc.

The OTF used to generate the image restoration filter can be calculated utilizing an optical design tool and an optical analytical tool. Moreover, the OTF can be measured at the actual condition of the image pickup apparatus itself or the image pickup optical system.

An output image processed by the image processor 104 is stored in an image recording medium 109 by a predefined format. This output image is a sharpened image in which the false-color generating degree is balanced with the restoration degree by the image restoration processing. In addition, the display unit 105 may display an image that is made by performing predefined processing for a post-correction image for displaying or an image that has not yet undergone the correction processing for quick displaying or an image that has undergone simple correction processing.

A series of processing in the image processor 104 is controlled by the system controller 110. The image pickup optical system controller 106 receives instructions from the system controller 110 and controls driving of the image pickup optical system 101.

An aperture value changes when an aperture diameter of the stop 101a is controlled. A position of the focus lens 101b is controlled by an autofocus ("AF") mechanism or manual focus mechanism (not illustrated) for focusing according to an object distance. An optical element, such as a low-pass filter and an infrared ray cutting filter, may be inserted into the image pickup optical system 101. When the optical element influences the OTF of the image pickup optical system 101, the image restoration filter needs to be made by taking the optical element into account. Since the inserted infrared ray cutting filter affects each PSF of the RGB channel that is an integration value of the PSF of the spectral wavelength, in particular, the PSF of the R channel, the optical element needs to be considered before the image restoration filter is made.

The image pickup optical system 101 may be integrated with or detachably attached to the body of the image pickup apparatus.

The image restoration processing may be changed according to an image point of the image pickup optical system 101 since the OTF changes according to the image point (position on an image) even on the same image pickup condition. More specifically, the image restoration filter is scanned while the convolution processing is performed for the image, and the image restoration filter may be changed for each predetermined area.

Figure 10:
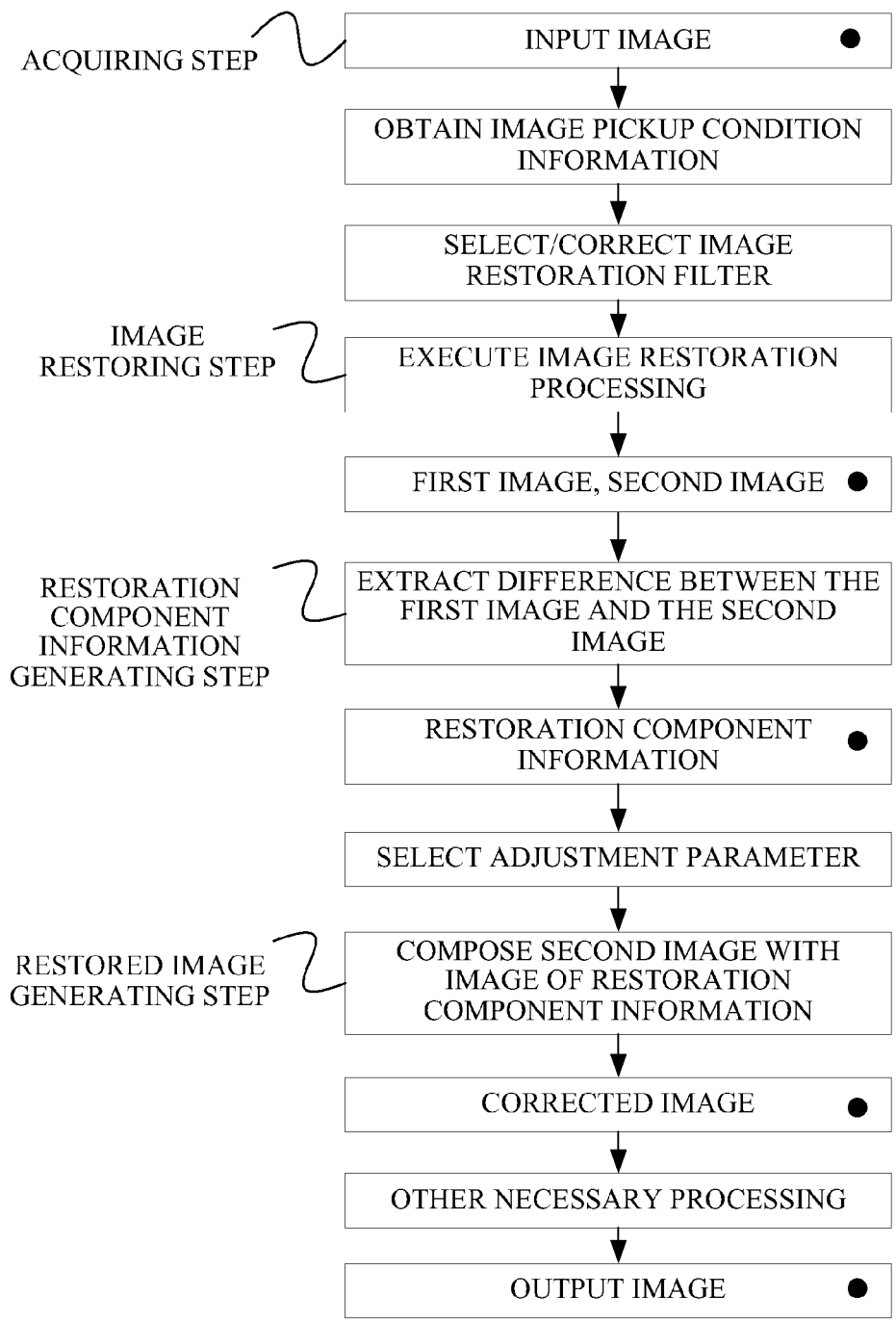
FIG. 10 is a flowchart for explaining the image processing according to the Embodiment 1.

The image restoration processing (image processing method) of this embodiment is executed by the image processor 104 illustrated in FIG. 1. FIG. 10 illustrates a specific flow relating to the image restoration processing of this embodiment executed by the image processor 104. In FIG. 10, a black dot denotes pixel data, such as an image, and other steps denote processing.

The image processor 104 obtains an input image in the image acquiring step. Next, the image processor 104 obtains image pickup condition information from the condition detector 107, and selects the image restoration filter suitable for the image pickup condition from the memory 108. The image processor 104 then provides the restoration processing to the input image by using the image restoration filter in the image restoration step. The image restoration step generates a first image in which an amplitude component and a phase component are corrected (or restored), and a second image in which only the phase component is corrected (or restored).

In the restoration component information generating step, the image processor 104 generates restoration component information based on a difference of a signal value for each pixel between the first image and the second image. The restoration component information contains difference information between the first image and the second image, and has a positive or negative value.

The image processor 104 obtains a set value of an adjustment parameter of the restoration level adjustment factor μ in this restoration component information generating step. A setting method of the adjustment parameter can automatically select it from preset values according to the image pickup condition and the image point, and sets the selected one. Alternatively, the adjustment parameter may be automatically changed and set by finding a feature amount of the pixel from the image. A user may arbitrarily set it.

Next, the image processor 104 composes the restoration component information with the second image according to the adjustment parameter and generates the corrected image in the restored image generating step. More specifically, the corrected image can be obtained by adding to the second image for each pixel a pixel value made by multiplying each pixel value of the restoration component information by the restoration level adjustment factor μ.

Next, the image processor 104 performs other processing necessary to form an image, and outputs a recovered (or corrected) image. The "other processing," as used herein, contains color interpolation processing (demosaicing processing) when the image that has undergone the correction processing is a mosaic image. The "other processing" also contains edge enhancement processing, shading correction (peripheral light amount correction), and distortion correction, etc. A variety of image processing including other processing described here can be inserted into or before or after the above flow if necessity arises.

While the context of each processing step and processing to be considered have been described, the order of the processing steps is not limited to this embodiment and may be modified according to the process restricting condition or required image quality. In addition, this embodiment restores only the phase component in the correction processing, but as described above, the amplitude component may be changed a little if the noise amplification is permissible.

The image processor 104 at least includes a processing unit and a temporary storage (buffer). For each image processing step, if necessary, an image is written (stored) in or read from the temporary memory. The temporary storage may use the memory 108.

Embodiment 2

Figure 11:
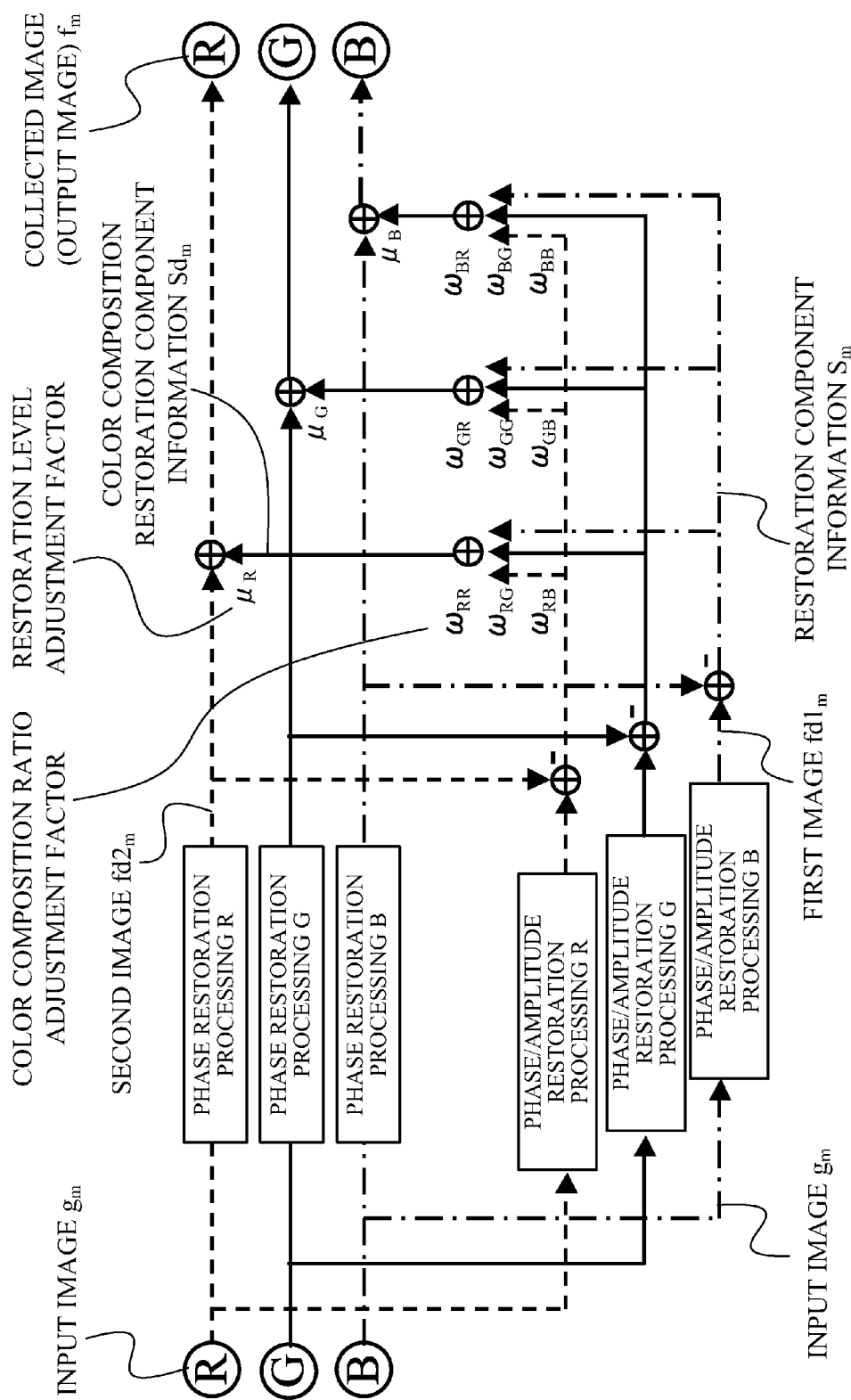
FIG. 11 is an explanatory view of image processing according to Embodiment 2 of the present invention.

In this embodiment, a description will be given of an image processing method for further restraining a generation of the false color caused by the image restoration processing. FIG. 11 illustrates a process flow for generating color composition restoration component information $Sd_m$ for each chromatic component by chromatically composing restoration component information $S_m$ for each chromatic component according to a color composition ratio adjustment factor ω, and for composing the color composition restoration component information $Sd_m$ with the second image $S_m$.

The color composition ratio adjustment factor ω is a mixture ratio of the chromatic components or a factor used to generate the color composition restoration component information $Sd_m$ (difference information) by chromatically composing the restoration component information (difference amount) $S_m$ for each of all chromatic components in accordance with the color composition ratio adjustment factor ω. Thus, Equation 7 or Equation 8 that develops Equation 7 with respect to chromatic components m and n expresses processing for generating the color composition restoration component information $Sd_m$ based on the restoration component information $S_m$:

$$Sd_m = \sum_n^{RGB} \omega_{mn} S_n \qquad \text{Equation 7}$$

$$\begin{pmatrix} Sd_R \\ Sd_G \\ Sd_B \end{pmatrix} = \begin{pmatrix} \omega_{RR} & \omega_{RG} & \omega_{RB} \\ \omega_{GR} & \omega_{GG} & \omega_{GB} \\ \omega_{BR} & \omega_{BG} & \omega_{BB} \end{pmatrix} \begin{pmatrix} S_R \\ S_G \\ S_B \end{pmatrix} \qquad \text{Equation 8}$$

A description will now be given of a method of determining nine color composition ratio adjustment factors ω of Equation 8. Initially, two examples of the color composition ratio adjustment factor ω will be described.

The first example is a color composition ratio adjustment factor ω used to obtain the same image as the first image $fd1_m$ (a corrected image), if the restoration level adjustment factor μ is set to 1. When the diagonal components of the color composition ratio adjustment factors ω of Equation 8 are set to 1 and the remainder is set to 0 so as to make a unit matrix, the color composition restoration component information $Sd_m$ is equal to the restoration component information $S_m$ on its chromatic component. This is a factor setting when the corrected image $f_m$ is output as the same image as the first image $fd1_m$. In this case, as described above, the corrected image is used to correct the aberrational component to the maximum, but has a risk of generating the false color.

The second example is a color composition ratio adjustment factor ω that completely eliminates a generation of the false color. When all elements in the color composition ratio adjustment factor ω in Equation 8 are set to 1/3, the color composition restoration component information $Sd_m$ is an average of the restoration component information $S_m$ for all chromatic components and the color composition restoration component information $Sd_R$, $Sd_G$, $Sd_B$ are completely identical to each other. When all color components of the color composition restoration component information $Sd_m$ are identical to one another, additional information relating to the chromatic components has no difference from one another and no false color occurs when the subsequent step composes the color composition restoration component information $Sd_m$ with the second image $fd2_m$.

Since the aberrational information of each chromatic component is averaged, the restoration degree or the sharpness becomes lower than the first example in which the first image $fd1_m$ is output as the output image. However, even when the restoration component information $S_m$ is averaged, the sharpness of the corrected image is better than that of the input image $g_m$ since the color composition restoration component information $Sd_R$, $Sd_G$, $Sd_B$ for the chromatic components have more or less a positive correlation (similarity). Therefore, this is a restoration condition that completely eliminates a risk of generating the false color.

The settings of the color composition ratio adjustment factor $\omega$ with a maximum risk of generating the false color and that with a minimum risk of generating the false color have been described. The balance between the risk of generating the false color and the restoration degree can be continuously adjusted by continuously changing the color composition ratio adjustment factor $\omega$.

A description will now be given of an illustrative determination method of an intermediate color composition ratio adjustment factor $\omega$ other than the color composition ratio adjustment factor $\omega$ in Equation 8 that is set to a unit matrix and the color composition ratio adjustment factor $\omega$ in Equation 8 that is set to all 1/3. Since the color composition ratio adjustment factor $\omega$ has nine set degrees of freedom, it may be difficult to set each element value. For example, it is one example that a general user variably sets the color composition ratio adjustment factor $\omega$ on an image pickup apparatus or an image processing system.

In order to solve this difficulty, the number of degrees of freedom to be controlled is reduced by setting the dependency among the elements of the color composition ratio adjustment factor $\omega$. However, this dependency needs to also adjust the balance between the risk of generating the false color and the restoration degree. For a supplier of an image pickup apparatus or an image processing system, a small number of degrees of freedom used to control the adjustment parameter improve the working efficiency in the development or production step of the image pickup apparatus.

Initially, two constraint conditions are set to an illustrative determination method of the color composition ratio adjustment factor $\omega$. The first constraint condition is to set a sum of the columns in the matrix $\omega$ in Equation 8 to 1 as in Equation 9. This corresponds to a normalization of a mixture ratio among the restoration component information $S_R$, $S_G$, and $S_B$ used to generate, for example, the color composition restoration component information $Sd_R$ for the R component. By normalizing the mixture ratio, ratios used for weighing among the different color composition restoration component information $Sd_m$ can be easily compared:

$$\sum_n^{RGB} \omega_{mn} = 1 \qquad \text{Equation 9}$$

The second restraint condition sets to 1 a sum of the rows of the matrix $\omega$ in Equation 8 as in Equation 10. This means that the restoration component information $S_R$, $S_G$, and $S_B$ is distributed and exhausted among the chromatic components in generating the color composition restoration component information $Sd_R$, $Sd_G$, and $Sd_B$:

$$\sum_m^{RGB} \omega_{mn} = 1 \qquad \text{Equation 10}$$

The color composition ratio adjustment factor $\omega$ can be expressed as in Equation 11 when the above two constraint conditions are provided:

$$\omega = \begin{pmatrix} \omega_{RR} & 1-\omega_{GG}-\omega_{BG} & \omega_{RB} \\ \omega_{GR} & \omega_{GG} & 1-\omega_{BB}-\omega_{RB} \\ 1-\omega_{RR}-\omega_{GR} & \omega_{BG} & \omega_{BB} \end{pmatrix} \qquad \text{Equation 11}$$

Since it is a purpose of this embodiment to restrain a risk of generating the false color while securing the restoration degree, the color composition restoration component information $Sd_m$ is expected to have high similarity or small difference. In the above description where $\omega$ is set to 1/3, there is no difference among chromatic components of the color composition restoration component information $Sd_m$ and a risk of generating the false color is minimum or the false color is little generated. Since the restoration component information $S_m$ for a certain chromatic component is distributed to the color composition restoration component information $Sd_m$ for each chromatic component as equally as possible, a risk of generating the false color is reduced as the dispersion in each row of Equation 11 is lower.

When the dispersion of each row of Equation 11 is minimized based on the above rule, the dispersion can be expressed as in Equation 12. A setting parameter of Equation 12 is one $\omega$, and thus the restoration degree and a risk of generating the false color can be easily controlled:

$$\omega = \begin{pmatrix} \omega & (1-\omega)/2 & (1-\omega)/2 \\ (1-\omega)/2 & \omega & (1-\omega)/2 \\ (1-\omega)/2 & (1-\omega)/2 & \omega \end{pmatrix} \qquad \text{Equation 12}$$

When $\omega$ is set to 1 in Equation 12, the matrix $\omega$ becomes a unit matrix and both the restoration degree and the risk of generating the false color become largest. When $\omega$ is set to 1/3, all elements of the matrix $\omega$ becomes 1/3, the restoration degree lowers and there is no risk of generating the false color at all. When the color composition ratio adjustment factor $\omega$ is adjusted in a range of $1/3 \le \omega \le 1$, the risk of generating the false color can be reduced.

An illustrative determination method of the color composition ratio adjustment factor $\omega$ has been described but is not limited to this embodiment. For example, when all elements of the matrix $\omega$ are set to zero, all chromatic components of the color composition restoration component information $Sd_m$ become zero and thus the corrected image $f_m$ becomes the very second image $fd2_m$. Thus, by adjusting the color composition ratio adjustment factor $\omega$ in a range $0 \le \omega \le 1$, the output image can be adjusted in a range from the second image $fd2_m$ in which only a phase component is restored to the first image $fd1_m$ in which both an amplitude component and a phase component are restored. The correction can be further enhanced by setting Equation 9 to a value larger than 1.

Thus, the number of set degrees of freedom of each element in the matrix $\omega$ is not limited to one, and nine degrees of freedom or the degree of freedom reduced by another constraint condition may be used for the adjustment. For example, there are six degrees of freedom when Equation 11 is used for the setting.

The range of the color composition ratio adjustment factor ω is not limited to 1/3≤ω≤1 which is used to obtain the input image or enhanced image as the above corrected image $f_m$. In other words, Equation 12 is a mere example to easily determine the restoration degree and the risk of generating the false color utilizing one setting parameter ω. One characteristic of this embodiment is to restrain the risk of generating the false color by composing the restoration component information $S_m$ among the chromatic components, and by controlling the similarities among the chromatic components of color composition restoration component information $Sd_m$.

The color composition ratio adjustment factor ω and restoration component adjustment factor μ can be controlled in combination as in Equation 13. When the color composition ratio adjustment factor ω is combined with the restoration component adjustment factor μ, the color composition ratio adjustment factor ω set to a range of 1/3≤ω≤1 so as to restrain the generation of the false color and the restoration component adjustment factor μ set to a range of 0≤ω≤1 can be used to control the restoration degree:

$$f_m = g_m + \mu_m Sd_m = g_m + \mu_m \sum_n^{RGB} \omega_{mn}(fd_n - g_n) \qquad \text{Equation 13}$$

The restoration component adjustment factor μ may be commonly used for the chromatic components as in Equation 14.

$$f_m = g_m + \mu Sd_m = g_m + \mu \sum_n^{RGB} \omega_{mn}(fd_n - g_n) \qquad \text{Equation 14}$$

In order to chromatically compose the restoration component information $S_m$ among the chromatic components, as described above, each pixel needs to possess a plurality of pieces of chromatic component information. Thus, in order to perform the above image restoration processing for a mosaic image in which each pixel has only one chromatic component information, it is necessary to perform color interpolation processing (demosaicing processing) prior to the color composition processing. The restoration component information $S_m$ in which each pixel possesses a plurality of pieces of chromatic component information may be generated by performing the color interpolation processing for the restoration component information $S_m$ for each chromatic component or by performing the color interpolation processing for each of the first image $fd1_m$ and the second image $fd2_m$.

Embodiment 3

Figure 12:
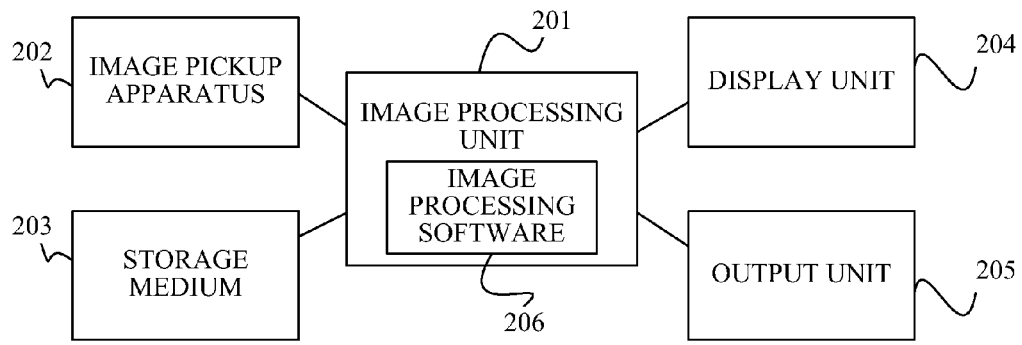
FIG. 12 is an explanatory view of an image processing system according to Embodiment 3 of the present invention.

FIG. 12 illustrates a configuration of an image processing system according to Embodiment 3 of the present invention. An image processing apparatus 201 includes a computer, and includes image processing software (image processing program) 206 which enables the computer to execute the image processing method described in Embodiment 1 or 2.

An image pickup apparatus 202 may include a camera, a microscope, an endoscope, a scanner, etc. A storage medium 203 stores an image (taken image data) generated by image pickup, and may include a semiconductor memory, a hard disk drive, a server on a network, etc.

The image processing apparatus 201 obtains taken image data from the image pickup apparatus 202 or storage medium 203, and outputs output image (corrected image) data that has received predetermined image processing to at least one of an output unit 205, image pickup apparatus 202, and the storage medium 203. The output destination may be a built-in memory in the image processing apparatus 201 so that the memory can store the output image data. The output unit 205 may include a printer, etc. The image processing apparatus 201 is connected to the display unit 204 as a monitor. A user may perform image processing through the display unit 204 and can evaluate the corrected image. The image processing software 206 has a development function and other image processing functions, if necessary, besides the image restoration processing function (a correction function of the phase degradation component or an amplitude degradation component) and the restoration degree adjustment function.

Figure 13:
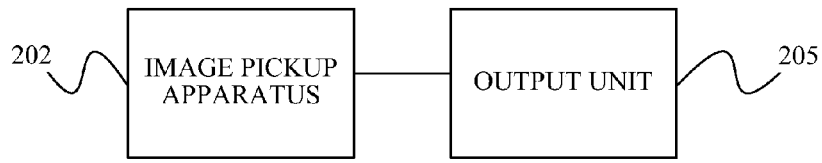
FIG. 13 is an explanatory view of another image processing system according to the Embodiment 3.

FIG. 13 illustrates a configuration of another image processing system. When the image pickup apparatus 202 singularly performs image processing of Embodiments 1-3 as in Embodiment 1, the corrected image can be output directly from the image pickup apparatus 202 to the output unit 205.

When the output unit 205 includes the image processing apparatus configured to execute the image processing methods of Embodiments 1 and 2, the image restoration processing and the restoration degree adjustment may be performed in the output unit 205. A high quality image may be provided through the restoration degree adjustment by taking the image degradation characteristic into consideration at the output time of the output unit 205.

Figure 14:
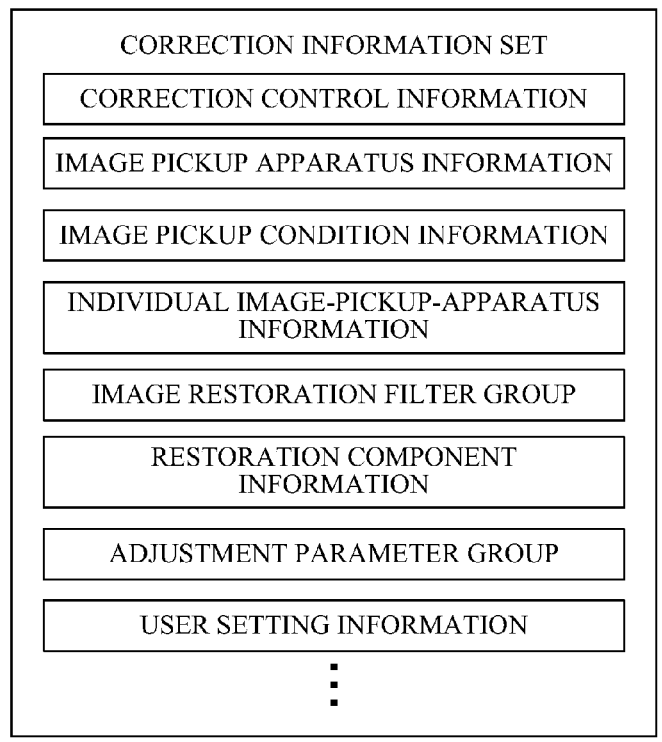
FIG. 14 is an explanatory view of the correctional information set in the Embodiment 3.
Figure 15:
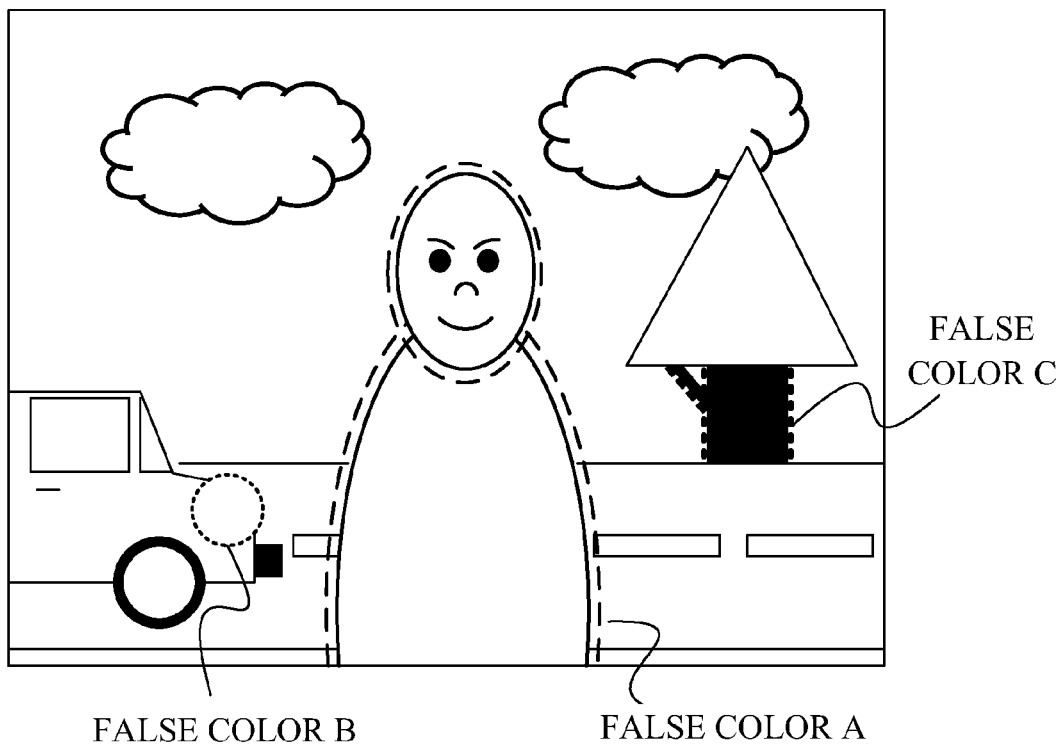
FIG. 15 is an explanatory view of a false color.

A description will now be given of the contents and delivery of the correction data used for image processing including correction processing of a phase degradation component and an amplitude degradation component. FIG. 14 illustrates the contents of the correction data. The correction information set has the following information relating to the correction.

"Correction Control Information"

Correction control information includes setting information representing which of the image pickup apparatus 202, the image processing apparatus 201, and output unit 205 is used for the correction processing, and selection information used to select data to be transmitted to the other unit according to the setting information. For example, when the image pickup apparatus 202 performs only the image restoration processing and the image processing unit 201 adjusts the restoration degree, it is unnecessary to transmit the image restoration filter to the image processing apparatus 201 but it is necessary to transmit at least the second image and the first image or the restoration component information.

"Image Pickup Apparatus Information"

Image pickup apparatus information is identification data of image pickup apparatus 202 corresponding to a product name. When a lens is replaceably attached to a camera body, the image pickup apparatus information is the identification data includes the combination.

"Image Pickup Condition Information"

Image pickup condition information is information relating to the condition of the image pickup apparatus 202 at the image pickup time, such as the focal length, the aperture value, the object distance, the ISO sensitivity, and the white balance setting, etc.

"Individual Image-Pickup-Apparatus Information"

Individual image-pickup-apparatus information is identification data of an individual image pickup apparatus in the above image pickup apparatus information. Since the OTF of the image pickup apparatus individually scatters due to manufacturing errors, the individual image-pickup-apparatus information is effective information used to individually set the best restoration degree adjustment parameter. The restoration degree adjustment parameter includes a restoration level adjustment factor μ and a color composition ratio adjustment factor ω.

"Image Restoration Filter Group"

An image restoration filter group is a set of image restoration filters used for the image restoration processing. When a unit configured to perform the image restoration processing has no image restoration filter, it is necessary to transmit an image restoration filter from another unit.

"Restoration Component Information"

When the image restoration processing has already been performed, the restoration component information has been generated, and the second image in which the phase has been corrected and the restoration component information are transmitted to other units, another unit can adjust the restoration degree.

"Adjustment Parameter Group"

An adjustment parameter group is a set of the color composition ratio adjustment factor ω and the restoration level adjustment factor μ. The color composition ratio adjustment factor ω and the restoration level adjustment factor μ are variable according to a position of an image as described above or according to an image pickup condition. Data of the adjustment parameter group may be table data of the adjustment factors or a function used to determine the adjustment factor.

"User Setting Information"

User setting information may contain an adjustment parameter used to adjust to the restoration degree suitable for a user's favor or a correction function of the adjustment parameter. When the user setting information is used, a desired output image can be always obtained as an initial value although the user can variably set the adjustment parameter. The most favorable sharpness of the user setting information may be updated by a learning function from the history determined by the user determined adjustment parameter.

Alternatively, a supplier (manufacturer) of the image pickup apparatus can provide preset values corresponding to some sharpness patterns via a network.

The above correctional information set may be attached to individual image data. A unit equipped with the image processing apparatus may provide the image restoration processing and the restoration degree adjustment processing when necessary correctional information is attached to the image data. The contents of the correctional information set can be modified automatically or manually if necessary. For example, when the other unit is used to adjust the restoration degree and the correctional information set contains the second image and the restoration component information, no image restoration filters are basically necessary.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-279325, filed Dec. 9, 2009, which is hereby incorporated by reference herein in its entirety.

What is claimed is:

1. An image processing method comprising:
obtaining an input image generated by an image pickup system;
generating a first image through restoration processing of an amplitude component and a phase component of the input image, the restoration processing being performed to reduce an amplitude degradation component and a phase degradation component, which are generated by degradation of the amplitude and phase components due to aberration of the image pickup system, by using an image restoration filter generated based on an optical transfer function of the image pickup system, the phase degradation component being an asymmetric image component corresponding to an asymmetric point spread function of the image pickup system, the reduction of the phase degradation component increasing symmetry of the phase degradation component, and the restoration processing being performed by convolution of the image restoration filter on the input image;
generating a second image that has an equal state of the phase component to that of the first image and a different state of the amplitude component from that of the first image through the restoration processing of the phase component without the restoration processing of the amplitude component of the input image;
obtaining difference information between the first image and the second image;
setting a restoration level adjustment factor to be used to adjust a restoration degree in the restoration processing; and
generating a restoration adjusted image by composing the difference information with the second image according to the restoration level adjustment factor.

2. The image processing method according to claim 1, wherein the input image includes a plurality of chromatic components,
wherein the difference information is obtained by composing a difference amount between the first image and the second image for each chromatic component in accordance with a color composition ratio adjustment factor representing a composition ratio among the chromatic components, and
wherein the restoration level adjustment factor is set for each chromatic component.

3. An image processing apparatus configured to process an input image generated by an image pickup system, the image processing apparatus comprising:
a processor configured to generate a first image through restoration processing of an amplitude component and a phase component of the input image, and to generate a second image that has an equal state of the phase component to that of the first image and a different state of the amplitude component from that of the first image through the restoration processing of the phase component without the restoration processing of the amplitude component of the input image, the restoration processing being performed to reduce an amplitude degradation component and a phase degradation component, which are generated by degradation of the amplitude and phase components due to aberration of the image pickup system, by using an image restoration filter generated based on an optical transfer function of the image pickup system, the phase degradation component being an asymmetric image component corresponding to an asymmetric point spread function of the image pickup system, the reduction of the phase degradation component increasing symmetry of the phase degradation component, and the restoration processing being performed by convolution of the image restoration filter on the input image;
a factor setting unit configured to set a restoration level adjustment factor to be used to adjust a restoration degree in the restoration processing; and
an image restoration unit configured to generate a restoration adjusted image by composing difference information between the first image and the second image, with the second image according to the restoration level adjustment factor.

4. An image pickup apparatus comprising:
an image pickup system configured to generate a taken image through a photoelectric conversion of an object image formed by an image pickup optical system; and
an image processing apparatus configured to process the taken image as an input image,
wherein the image processing apparatus includes:
a processor configured to generate a first image through restoration processing of an amplitude component and a phase component of the input image, and to generate a second image that has an equal state of the phase component to that of the first image and a different state of the amplitude component from that of the first image through the restoration processing of the phase component without the restoration processing of the amplitude component of the input image, the restoration processing being performed to reduce an amplitude degradation component and a phase degradation component, which are generated by degradation of the amplitude and phase components due to aberration of the image pickup system, by using an image restoration filter generated based on an optical transfer function of the image pickup system, the phase degradation component being an asymmetric image component corresponding to an asymmetric point spread function of the image pickup system, the reduction of the phase degradation component increasing symmetry of the phase degradation component, and the restoration processing being performed by convolution of the image restoration filter on the input image;
a factor setting unit configured to set a restoration level adjustment factor to be used to adjust a restoration degree in the restoration processing; and
an image restoration unit configured to generate a restoration adjusted image by composing difference information between the first image and the second image, with the second image according to the restoration level adjustment factor.

5. An apparatus including a hardware processor and memory configured to execute an image processing program that performs an image processing method,
wherein the image processing method includes:
obtaining an input image generated by an image pickup system;
generating a first image through restoration processing of an amplitude component and a phase component of the input image, the restoration processing being performed to reduce an amplitude degradation component and a phase degradation component, which are generated by degradation of the amplitude and phase components due to aberration of the image pickup system, by using an image restoration filter generated based on an optical transfer function of the image pickup system, the phase degradation component being an asymmetric image component corresponding to an asymmetric point spread function of the image pickup system, the reduction of the phase degradation component increasing symmetry of the phase degradation component, and the restoration processing being performed by convolution of the image restoration filter on the input image;
generating a second image that has an equal state of the phase component to that of the first image and a different state of the amplitude component from that of the first image through the restoration processing of the phase component without the restoration processing of the amplitude component of the input image;
obtaining difference information between the first image and the second image;
setting a restoration level adjustment factor to be used to adjust a restoration degree in the restoration processing; and
generating a restoration adjusted image by composing the difference information with the second image according to the restoration level adjustment factor.

6. A non-transitory recording medium that stores an image processing program that enable a computer to execute an image processing method,
wherein the image processing method includes:
obtaining an input image generated by an image pickup system;
generating a first image through restoration processing of an amplitude component and a phase component of the input image, the restoration processing being performed to reduce an amplitude degradation component and a phase degradation component, which are generated by degradation of the amplitude and phase components due to aberration of the image pickup system, by using an image restoration filter generated based on an optical transfer function of the image pickup system, the phase degradation component being an asymmetric image component corresponding to an asymmetric point spread function of the image pickup system, the reduction of the phase degradation component increasing symmetry of the phase degradation component, and the restoration processing being performed by convolution of the image restoration filter on the input image;
generating a second image that has an equal state of the phase component to that of the first image and a different state of the amplitude component from that of the first image through the restoration processing of the phase component without the restoration processing of the amplitude component of the input image;
obtaining difference information between the first image and the second image;
setting a restoration level adjustment factor to be used to adjust a restoration degree in the restoration processing; and
generating a restoration adjusted image by composing the difference information with the second image according to the restoration level adjustment factor.

* * * * *